United States Patent [19]

Silberberg

[11] 4,274,995

[45] Jun. 23, 1981

[54] FILLED POLYOLEFIN COMPOSITIONS HAVING IMPROVED THERMAL STABILITY

[75] Inventor: Joseph Silberberg, Brooklyn, N.Y.

[73] Assignee: Stauffer Chemical Company, Westport, Conn.

[21] Appl. No.: 109,747

[22] Filed: Dec. 31, 1979

[51] Int. Cl.$^3$ .................... C08K 3/26; C08K 3/34; C08K 5/52; C08K 9/04

[52] U.S. Cl. .................... 260/42.14; 260/42.45; 260/45.7 P

[58] Field of Search .............. 260/42.14, 42.45, 45.7 P

[56] References Cited

U.S. PATENT DOCUMENTS

| | | | |
|---|---|---|---|
| 2,990,421 | 6/1961 | Melton et al. | 260/953 |
| 3,553,158 | 1/1971 | Gilfillan | 260/42.45 |
| 3,792,008 | 2/1974 | Neuroth | 260/30.6 SB |
| 4,098,752 | 7/1978 | Ohkawa et al. | 260/42.45 |
| 4,116,897 | 9/1978 | Huszar et al. | 260/42.45 |
| 4,174,340 | 11/1979 | Luders et al. | 260/42.45 |
| 4,183,843 | 1/1980 | Koenig et al. | 260/45.7 P |

*Primary Examiner*—Maurice J. Welsh
*Assistant Examiner*—R. A. White
*Attorney, Agent, or Firm*—Richard P. Fennelly

[57] ABSTRACT

Filled polyolefin compositions having improved thermal stability characteristics are formed by incorporation therein of an effective amount for improvement of such a characteristic of a composition comprising a substantially neutral lower alkoxylated alkyl acid phosphate ester. In certain filled polyolefin compositions the phosphate ester composition also results in color improvement.

9 Claims, No Drawings

FILLED POLYOLEFIN COMPOSITIONS HAVING IMPROVED THERMAL STABILITY

BACKGROUND OF THE INVENTION

1. Field of the Invention

The present invention relates to filled polyolefin compositions having improved thermal stability characteristics, and, in certain cases, improved color.

2. Description of the Prior Art

Fillers have been used in polyolefin polymers to impart such effects as improved dimensional rigidity and lower costs to the resulting blend of filler and polymer. Such filled polyolefin compositions find utility in a wide variety of applications, including in the manufacture of various formed and molded articles, e.g., appliance components, under-the-hood automotive parts, and instrument housings. However, use of these polymers at relatively high service temperatures has sometimes resulted in thermal degradation of the polymer/filler blend. Also, the use of certain types of fillers in polyolefin polymers result in a blend having a color that is darker than desired. Various approaches have been used to improve the thermal stability and color chracteristics of such filled polyolefin compositions.

U.S. Pat. No. 3,425,980 to B. O. Baum advocates the use of a non-acidic, oxygen-containing hydrocarbon or halogenated hydrocarbon compound to coat clay fillers contained in polyethylene compositions to yield novel white and colorable polyethylene compositions.

U.S. Pat. No. 3,553,158 teaches the use of a variety of "talc deactivating compounds" including such organic polar compounds as epoxides, amides, acrylate polymers, and aliphatic polyols to improve ther thermal stability of talc-filled polypropylene.

More recently, Japanese Kokai 77 45,644 (as abstracted in Chem. Abstr., Vol. 87, 54094y, 1977) teaches a heat resistant polyolefin resin-containing filler and a mixture of polyoxyalkylene acid phosphates and a sulfur-containing compound of the formula $C(CH_2OCOCH_2CH_2SR)_4$ where R is a $C_{10}$-$C_{20}$ alkyl group.

SUMMARY OF THE PRESENT INVENTION

The present invention are filled polyolefin compositions containing an effective amount of a composition comprising a lower alkoxylated alkyl acid phosphate for improved thermal stability of said polyolefin compositions and, in certain cases, improved color characteristics, as well.

DETAILED DESCRIPTION OF THE PRESENT INVENTION

The polyolefin resin and fillers which form major components of the claimed compositions are well-known to persons of ordinary skill in the art.

The polyolefin resins which are suitable for use in the present invention include such well-known polymers as polyethylene and polypropylene. The polyolefin resin will generally comprise from about 30% to about 95%, by weight of the blend of the present invention.

The type of filler material which is used in the blend of the present invention is known to the person of ordinary skill in the art. It is a finely divided material having an average particle size of from about 0.01 micron to about 100 microns, preferably from about 0.03 micron to about 25 microns, so as to be suitable as a filler material for polyolefin substrates. The type of inorganic filler which may be used in the practice of the present invention includes such fillers as the metal silicates and carbonates. A representative example of a silicate material is talc which is a magnesium silicate. A representative preferred example of a metal carbonate is calcium carbonate. Other suitable fillers include magnesium carbonate, hydrated alumina, silica, aluminum silicate, magnesium oxide, iron oxide, diatomaceous earth, mica, kaolin, and bentonite. The filler material will generally be present in the blend of the present invention at from about 5% to about 70%, by weight of the blend.

The blends of the present invention involve the incorporation in the blend of polyolefin and filler of an effective amount for improved thermal stability for such blends of a composition comprising a substantially neutral lower alkoxylated alkyl acid phosphate ester. This phosphate ester composition can be added to the filler before it is admixed with the polyolefin, to either the filler or polyolefin as they are mixed, or can be added to the mixture before it is melt processed. The composition can be added neat or dissolved in a low boiling organic solvent, such as methylene chloride. Effective amounts range from about 0.1% to about 3%, based on the weight of filler in the composition.

In order to achieve the desired improvement in thermal stability and, in certain cases, color improvement, for the filled polyolefin compositions of the present invention, the present invention contemplates the presence of an effective amount of a composition comprising a substantially neutral lower alkoxylated alkyl acid phosphate ester. Such compositions can be formed by first reacting a suitable alkyl alcohol with phosphorus pentoxide, for example at a molar ratio of 2 to 1, to form a dialkyl acid pyrophosphate which can be hydrolyzed, for example, by an equimolar amount of water, to form an alkyl acid phosphate composition. This phosphate composition is then reacted with an appropriate lower alkylene oxide, such as ethylene oxide, for example, at a molar ratio of 1 to 3, to most comonly yield a mixture of a major amount of one or more lower alkoxylated alkyl acid phosphate esters in the presence of a minor amount (e.g., about 35% to about 15%, by weight) of alkoxylated phosphoric acid and some unreacted alkyl alcohol. This general type of reaction is described in U.S. Pat. No. 3,586,897 to W. H. Woodstock and in "Phosphorus and Its Compounds", John R. Van Wazer, ed., Vol. II, pp. 1227–1229 (Interscience Publishers, Inc., New York, 1961).

The lower alkoxylated alkyl acid phosphate ester has the following formula:

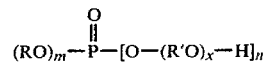

where x is an integer of from 1 to 5, m and n are either 1 or 2, with the sum of m and n being 3, R is a $C_1$-$C_{20}$ alkyl group, and R' is a $C_2$-$C_5$ alkylene group. A suitable composition of this type is available commercially as VICTAWET 12 from Stauffer Chemical Company (a mixture comprising about 10-25% by weight, di(2-ethylhexyl)hydroxyethyl phosphate and about 50%-65%, by weight, of mono(2-ethylhexyl)hydroxyethyl polyoxyethylene phosphate).

In addition to the foregoing described polyolefin resin, filler, and phosphate ester composition, the blends of the present invention can also contain any compatible conventional additives normally used in filled polyolefin resin compositions which do not frustrate the purpose of the phosphate compositions. Representative additives of this type include: flame retardants, colorants, lubricants, processing aids, other antioxidants and stabilizers, and the like.

The following Examples are presented to illustrate certain embodiments of the present invention.

EXAMPLES 1 AND 2

These Examples illustrate the improvement in color that was noted for a polypropylene composition filled with talc in accordance with the present invention.

General purpose, injection grade polypropylene (HERCULES 6523) was fluxed in a Brabender mixer at 200° C., 60 rpm. for 5 minutes. In Example 1, untreated 50%, by weight, of Montana talc was then added, and the mixture was fluxed for 10 minutes. In Example 2, 50% by weight of Montana talc, which had been treated with 1.6%, by weight of the talc, of a mixture comprising about 10–15%, by weight, of a di(ethylhexyl)hydroxyethyl phosphate and of about 60–65%, by weight, of a mono(2-ethylhexyl)hydroxyethyl polyoxyethylene phosphate, about 7–10%, by weight, of 2-ethylhexanol, and about 12–17%, by weight of oxyethylated phosphoric acid, (available as VICTAWET 12 from Stauffer Chemical Company), was added to the polypropylene, and this mixture was fluxed for 10 minutes.

The respective mixtures from Examples 1 and 2 were each compression molded at 193° C. to form plaques having a thickness of 0.14 cm. These plaques were tested in a Hunter color meter and the following results were obtained:

| Example | Hunter Color ($\Delta E$) |
| --- | --- |
| 1 (Control) | 50 |
| 2 | 29 |

The value $\Delta E$ is the color difference from a magnesium oxide standard and encompasses changes along the light-dark, red-green, and yellow-blue color coordinates. Lower numbers indicate a less colored specimen. These values were calculated using the Hunter L, $a_L$, $b_L$ color difference formula which is described in Wyczecki et al., Color Science: Concepts and Methods, Quantitative Data and Formulas, Table 6.3, Formula No. 6, p. 460 (John Wiley and Sons, Inc., New York, 1970) using a Hunter Associates Laboratory tristimulus Colorimeter (Model D25-D2).

EXAMPLE 3–10

These Examples also illustrate the improvement noted with the present invention in various polypropylene/Montana talc samples. The Montana talc was present at 50%, by weight, for all Examples and the processing was at 200° C. in a Brabender mixer. The Hunter color was measured for 0.14 cm. plaques that had been compression molded at 193° C. The percentages of phosphate composition (VICTAWET 12) are expressed as percentages of the total weight of talc plus polypropylene.

EXAMPLE 3

The polypropylene was fluxed for 5 minutes prior to addition of the talc which had been treated with 0.5%, by weight of filler, of phosphate (neat). The mixture of polypropylene and treated talc was fluxed for ten minutes.

EXAMPLE 4

This was the same as Example 3 with the exception that the phosphate level was increased to 1.0%, by weight of filler.

EXAMPLE 5

This was the same as Example 3 with the exception that the phosphate level was increased to 2.0%, by weight of filler.

EXAMPLE 6

This was the same as Example 4 with the the exception that the phosphate was added to the talc as a 25%, by weight solution, in dichloromethane, and then dried.

EXAMPLE 7

This was the same as Example 4 with the exception that the equivalent amount of phosphate was blended with the polypropylene and the talc was then added.

EXAMPLE 8

This represents a control run and is similar to Example 3 but no phosphate was used to treat the talc.

EXAMPLE 9

This represents another control run and is similar to Example 8 with the exception that the polypropylene/talc mixture was fluxed for 25 minutes after the addition of the talc.

EXAMPLE 10

This was similar to Example 4 but the mixture of polypropylene and talc was fluxed for 25 minutes after the addition of talc.

The following results were obtained with lower values indicating a less colored sample. Examples 3–7 and 10 are in accordance with the present invention, whereas Examples 8 and 9 represent control runs.

| Example | Hunter color ($\Delta E$) |
| --- | --- |
| 3 | 32 |
| 4 | 30 |
| 5 | 28 |
| 6 | 31 |
| 7 | 28 |
| 8 (Control) | 51 |
| 9 (Control) | 55 |
| 10 | 39 |

EXAMPLES 11–14

These Examples illustrate the improved color values and oven stability for compositions made in accordance with the present invention and the mechanical properties of the blends.

Polypropylene at 60%, by weight, and 40% by weight of talc were used in Examples 11 and 13 as control formulations. Examples 12 and 14 also used 1.6%, by weight of talc, of the phosphate additive of Example 1. The ingredients were mixed in a Patterson Kelley mixer, were extruded at about 204°–232° C. at 55 rpm. and were injection molded at about 218°–232° C. into 0.32 cm. thick plaques. Examples 11 and 12 contained California talc, whereas 13 and 14 contained Montana talc.

The following results were obtained:

| Example | Hunter Color (ΔE) | Oven Stability (days) |
| --- | --- | --- |
| 11 (Control) | 39 | 2 |
| 12 | 25 | 21 |
| 13 (Control) | 49 | 1 |
| 14 | 33 | 16 |

Oven stability is determined by heating the specimens in a circulating air oven at 150° C. until a powdery residue forms on the specimen surface. Higher numbers are more desirable.

The mechanical properties of the samples were as follows:

| Example | DTL (°C.) | Tensile Str. (1) (MPa) | Tensile Elong. (1) (%) | Tensile Modulus (1) (GPa) |
| --- | --- | --- | --- | --- |
| 11 (Control) | — | 33.0 | 21 | 0.83 |
| 12 | 62 | 30.8 | 22 | 0.76 |
| 13 (Control) | 59 | 32.5 | 17 | 0.83 |
| 14 | 64 | 30.7 | 17 | 0.76 |

| Example | Flexural Str. (2) (MPa) | Flexural Modulus (2) (GPa) | Reverse Notch Impact (3) (J/m) |
| --- | --- | --- | --- |
| 11 (Control) | 57.6 | 3.85 | 133 |
| 12 | 53.9 | 3.58 | 123 |
| 13 (Control) | 57.5 | 3.78 | 123 |
| 14 | 54.5 | 3.56 | 112 |

(1) tested in accordance with ASTM D-638 exept that the specimens were 1.27 cm. wide and 0.30 cm. thick. The gage length was 7.0 cm. and the crosshead speed was 5.08 cm./min.
(2) tested in accordance with ASTM D-790, Method I, Procedure B.
(3) tested in accordance with ASTM D-256, Method E, 0.3175 cm. thick specimens.

EXAMPLES 15–16

These Examples show the improvement in oven stability when the present invention is used in polypropylene/Vermont talc composition and demonstrate the heat stability effect to be independent of the color effect.

Polypropylene (60%, by weight) and Vermont talc (40%, by weight), available as VERTAL 100 from the Omya Division of Phuess-Staufer, were compounded on a 2-roll mill at 193° C. Example 15 is a control. In Example 16 the talc was treated with 2.0%, by weight of filler, of the phosphate additive of Example 1. The color of the respective samples was a dark charcoal-grey. The following results were obtained for the oven stability of the samples:

| Example | Oven Stability (days) |
| --- | --- |
| 15 (Control) | 4 |
| 16 | 21 |

EXAMPLES 17–19

These Examples show the results obtained when the invention was used with polypropylene/calcium carbonate blends. Examples 17 and 18 show control blends of 60% polypropylene and 40% calcium carbonate (ATOMITE from Thompson, Weinman Co.). The mixtures were extruded at 232° C. and injection molded at 190°–204° C. to form 0.32 cm. thick plaques. The filler of Example 18 was moistened with dichloromethane, mixed in a blender and dried before combination with the polypropylene.

In Example 19 the calcium carbonate had been treated with 1%, by weight of filler, of the phosphate of Example 1, using a dichloromethane solution, mixing in a blender, and drying.

The following results were obtained:

| Example | Hunter Color (ΔE) | Oven Stability (days) |
| --- | --- | --- |
| 17 (Control) | 16 | 4 |
| 18 (Control) | 13 | 2 |
| 19 | 10 | 28 |

EXAMPLES 20–21

These Examples show the improvement in both oven stability and color when the present invention is used in a propylene/Montana talc composition. The composition comprised 50%, by weight, Montana talc in polypropylene and was compounded on a Brabender apparatus at 180° C. t 60 rpm. The polypropylene had been fluxed for 5 minutes at that temperature prior to addition of the filler. Example 20 is a control run wherein the filler was untreated. The filler used in Example 21 was treated with 2%, by weight of the filler, of the phosphate composition described herein (VICTAWET 12). The respective compositions were then pressed into 0.081 cm. thick plaques for testing.

The following results were obtained:

| Example | Hunter Color (ΔE) | Oven Stability (days) |
| --- | --- | --- |
| 20 (Control) | 52 | <3 |
| 21 | 27 | 11 |

The foregoing Examples are intended to be merely illustrative of the present invention and should not therefore be construed in a limiting manner. The scope of protection that is desired is set forth in the claims which follow.

What is claimed:

1. A filled polyolefin composition having improved thermal stability comprising a polyolefin resin, an inorganic filler, and an effective amount for said improved stability of a composition comprising an alkoxylated alkyl acid phosphate.

2. A composition as claimed in claim 1 wherein the polyolefin is present at from about 30% to about 95%, by weight of the composition.

3. A composition as claimed in claim 1 wherein the filler is present at from about 5% to about 70%, by weight of the composition.

4. A composition as claimed in claim 1 wherein the phosphate composition is present at from about 0.1% to about 3%, by weight of the filler.

5. A composition as claimed in claim 1 wherein the polyolefin is selected from the group consisting of polyethylene and polypropylene.

6. A composition as claimed in claim 1 wherein the filler is selected from the group consisting of the silicates and metal carbonates.

7. A composition as claimed in either claim 1, 2, 3, 4, 5, or 6 wherein the filler is selected from the group consisting of talc and calcium carbonate.

8. A composition as claimed in either claim 1, 2, 3, 4, 5, or 6 wherein the phosphate has the formula:

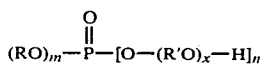

where x is an integer of from 1 to 5, m and n are either 1 or 2, with the sum of m and n being 3, R is a $C_1$-$C_{20}$ alkyl group, and R' is a $C_2$-$C_5$ alkyl group.

9. A composition as claimed in either claim 1, 2, 3, 4, 5, or 6 wherein the phosphate composition comprises a mixture of di(2-ethylhexyl)hydroxyethyl phosphate and mono(2-ethylhexyl)hydroxyethyl polyoxyethylene phosphate and the filler is selected from the group consisting of talc and calcium carbonate.

* * * * *

UNITED STATES PATENT AND TRADEMARK OFFICE
CERTIFICATE OF CORRECTION

PATENT NO. : 4,274,995
DATED : June 23, 1981
INVENTOR(S) : Joseph Silberberg

It is certified that error appears in the above-identified patent and that said Letters Patent are hereby corrected as shown below:

Col. 2, line 40, "comonly" should be -- commonly --;

Col. 2, line 46, "No. 3,586,897" should be -- 2,586,897 --; and

Col. 6, line 26, "t 60 rpm" should be -- at 60 rpm --.

Signed and Sealed this

First Day of December 1981

[SEAL]

Attest:

GERALD J. MOSSINGHOFF

Attesting Officer     Commissioner of Patents and Trademarks